(12) United States Patent
Nozaki et al.

(10) Patent No.: US 6,412,226 B1
(45) Date of Patent: Jul. 2, 2002

(54) CAR DOOR GLASS RUN

(75) Inventors: Masahiro Nozaki, Tsushima; Takayuki Terasawa, Hashima-gun, both of (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/493,817

(22) Filed: Jan. 28, 2000

(30) Foreign Application Priority Data

Mar. 31, 1999 (JP) .......................................... 11-090727

(51) Int. Cl.$^7$ .............................................. E05D 15/16
(52) U.S. Cl. .......................................... 49/441; 49/377
(58) Field of Search ....................... 49/440, 377, 495.1, 49/496.1, 441

(56) References Cited

U.S. PATENT DOCUMENTS

| | | | | |
|---|---|---|---|---|
| 4,864,774 A | * | 9/1989 | Onishi et al. ................. | 49/440 |
| 4,920,699 A | * | 5/1990 | Nagata et al. ................ | 49/441 |
| 4,956,941 A | * | 9/1990 | Vaughan ...................... | 49/440 |
| 5,217,786 A | * | 6/1993 | Keys ......................... | 428/122 |
| 5,226,258 A | * | 7/1993 | Mesnel et al. ............... | 49/490.1 |
| 5,365,698 A | | 11/1994 | Nozaki | |
| 5,447,749 A | | 9/1995 | Iwasa | |
| 5,475,947 A | * | 12/1995 | Dupuy ....................... | 49/490.1 |
| 5,628,150 A | * | 5/1997 | Mesnel ....................... | 49/440 |
| 6,082,048 A | * | 7/2000 | Backes et al. ............... | 49/377 |
| 6,115,969 A | * | 9/2000 | Nozaki ....................... | 49/479.1 |

FOREIGN PATENT DOCUMENTS

| JP | 5-21562 | 6/1993 |
|---|---|---|
| JP | 10-942 | 1/1998 |

\* cited by examiner

*Primary Examiner*—Curtis A. Cohen
(74) *Attorney, Agent, or Firm*—Pillsbury Winthrop LLP

(57) ABSTRACT

A door glass run in which first and second seal lips for holding the opposite surfaces of the circumferential edge of a door glass extend from interior and exterior side walls of a body portion having a substantially U-shape in section and attached to a door frame of a car door. The door glass run has such a structure that a sub-lip is formed at least on an intermediate portion of the interior side wall of a vertical portion of the door glass run for guiding the door glass moving up and down so that the sub-lip extends substantially in parallel with the first seal lip; a notch is formed near a base portion in the first seal lip so that the first seal lip is bent easily.

1 Claim, 4 Drawing Sheets

CAR DOOR GLASS RUN

BACKGROUND OF THE INVENTION

1. Field of the Invention

The present invention relates to a door glass run attached to a door frame of a car door along the inner circumference of the door frame.

The present application is based on Japanese Patent Application No. Hei. 11-90727, which is incorporated herein by reference.

2. Description of the Related Art

As shown in FIG. 2, a door glass run (hereinafter abbreviated to a glass run) 4 is attached to the inner circumferential side of a door frame 2 of a car door 1. The glass run 4 has a basic structure in which seal lips 44 and 45 for holding a circumferential edge portion of a door glass 3 from both sides thereof extend from ends of an interior side wall 42 and an exterior side wall 43 respectively of a body portion 40 having a substantially U-shape in section, as shown in FIG. 3. The body portion 40 is fitted to a channel portion 20 formed along the inner circumference of the door frame 2.

In addition, glass guides 46 projecting toward the door glass 3 so as to face the door glass 3 at ends thereof are formed on the interior side walls 42 or both the side walls 42 and 43 of front and rear vertical portions 4A along front and rear vertical frames 2A (FIG. 2) of the door frame 2 (Japanese Utility Model Publication No. Hei. 5-21462, and Japanese Patent Publication No. Hei. 10-942). These glass guides 46 not only have a function to guide the door glass 3 moving up and down so as to prevent the door glass 3 from rattling when the door glass 3 is moved up and down, but also have a function to prevent the door glass 3 from rattling when the door is closed.

However, in the above-mentioned conventional glass guide 46, when the end of the glass guide 46 is made close and opposite to the surface of the door glass 3 in order to improve the effect to prevent the door glass 3 from rattling, there is a fear that if the door glass 3 leans toward the glass guide 46 relatively due to the fitting scattering of the door frame 2 or the door glass 3, the door glass 3 is pressed onto the glass guide 46 through the seal lip 44 so as to make trouble in the sliding action of the door glass 3. On the other hand, when the end of the glass guide 46 is disposed apart from the glass surface in order to prevent such a trouble from occurring, there is a problem that the effect to prevent the door glass 3 from rattling cannot be obtained satisfactorily.

SUMMARY OF THE INVENTION

It is therefore an object of the prevent invention to provide a glass run which effectively prevents the door glass 3 from rattling, and in which there is no fear that the door glass is hindered from moving up and down.

In order to achieve the above object, according to the present invention, there is provided a car door glass run attached to a car door frame along an inner circumference thereof, comprising a body portion having a substantially U-shape in section, and first and second seal lips extending from interior and exterior side walls of the body portion respectively toward a deep inside of the body portion so as to approach each other, so that the first and second seal lips hold a circumferential edge portion of a door glass from both sides thereof when the door glass is shut; wherein at least on an interior side wall of a vertical portion of the door glass run for guiding the door glass moving up and down, a sub-lip is formed to extend from an intermediate portion of the interior side wall substantially in parallel with the first seal lip, and to have a tip end disposed to be inner and deeper in the body portion than a tip end of the first seal lip, and wherein a notch is formed in the first seal lip at a position near a base portion thereof so that the first seal lip can bend toward the sub-lip easily. And a protrusion is formed on the first seal lip at the tip end thereof so that the protrusion projects out toward the sub-lip so as to abut against a side surface of a tip end portion of the sub-lip when the first seal lip is bent large.

When the door glass comes in between the first and second seal lips, the first seal lip is bent at the portion where the notch is formed, so that the protrusion at the tip end approaches the sub-lip. When the door glass rattles so as to swing, the tip end of the first seal lip comes in contact with the sub-lip. While being bent, both the first seal lip and the sub-lip integrally support the door glass so as to absorb and restrain the swing. Even if the door glass leans toward the first seal lip due to the fitting scattering, this lean is absorbed by the bending of the first seal lip and the sub-lip so that no trouble is given to the door glass moving up and down.

Features and advantages of the invention will be evident from the following detailed description of the preferred embodiments described in conjunction with the attached drawings.

DETAILED DESCRIPTION OF THE PREFERRED EMBODIMENTS

Figure 2:
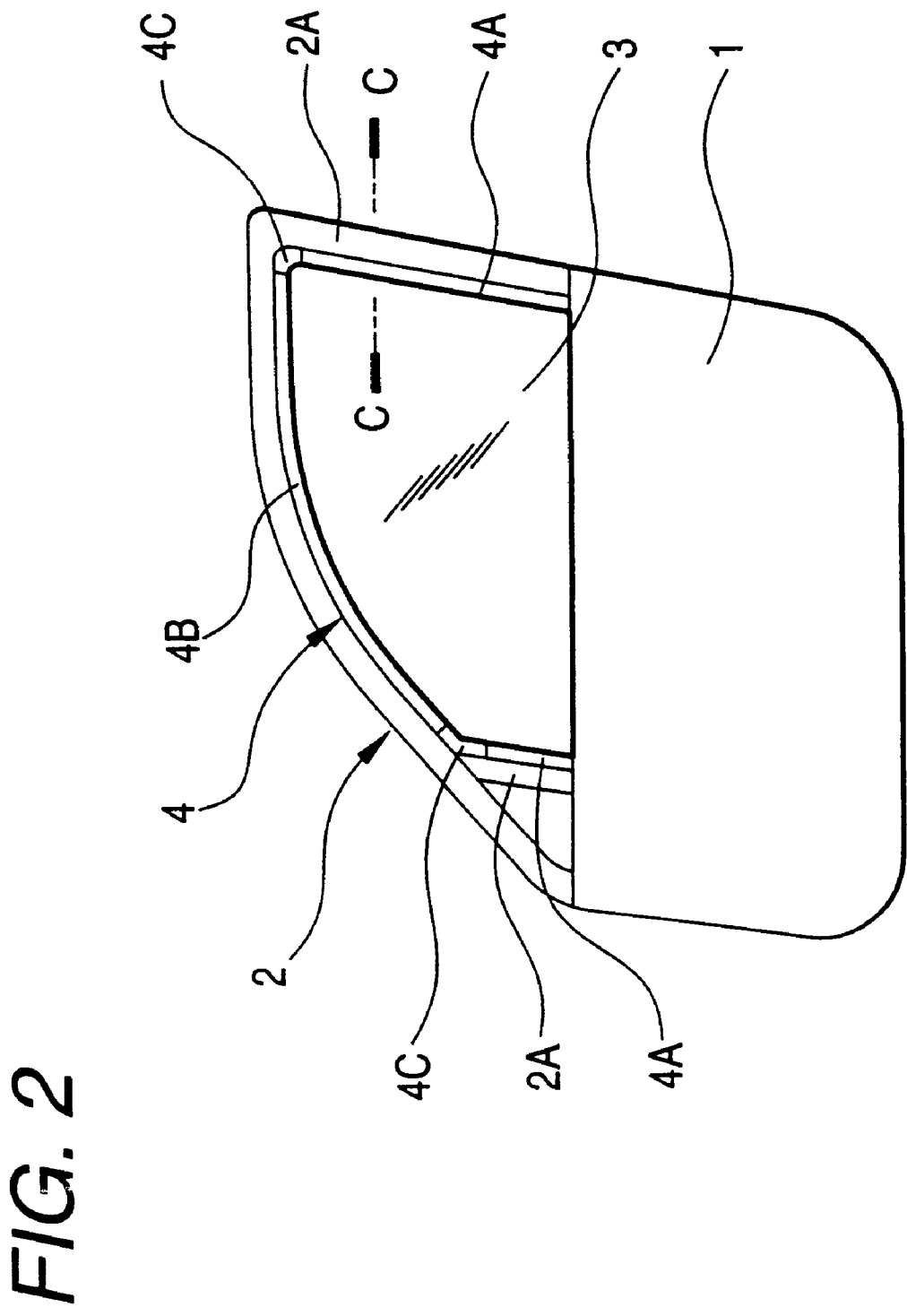
FIG. 2 shows a front view of a car door to which a door glass run has been attached.
Figure 3:
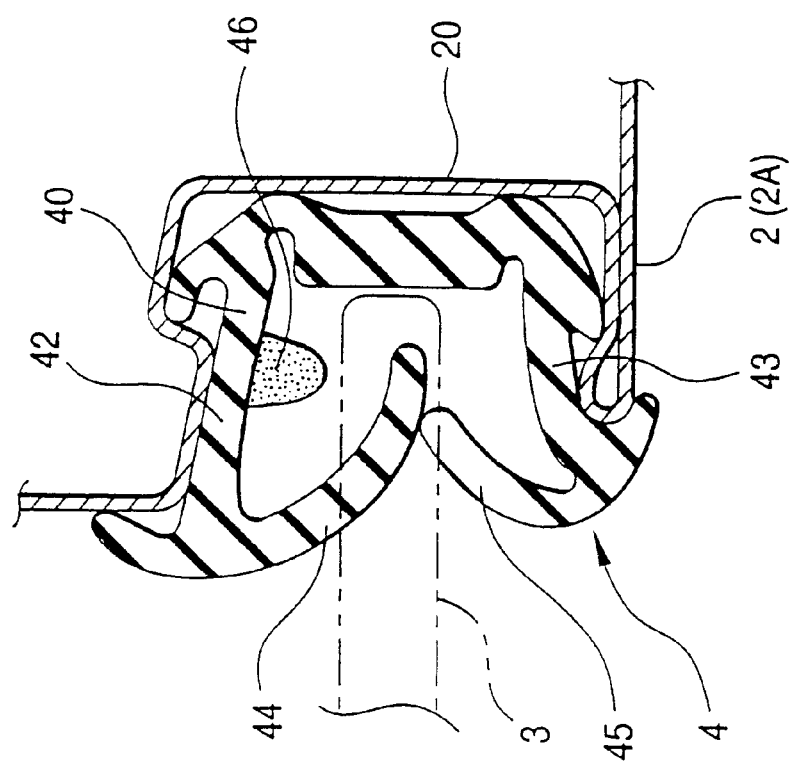
FIG. 3 shows a sectional view of an attachment state of a conventional door glass run, taken on line C—C in FIG. 2.

As shown in FIG. 2, a glass run 4 is constituted by: front and rear vertical portions 4A formed by extrusion molding for guiding the moving up and down of the door glass 3; an upper side portion 4B formed by extrusion molding and for receiving the upper edge of the door glass 3 when the door glass 3 reaches to its moving-up end; and connection portions 4C formed by molding for connecting the vertical portions 4A with the upper side portion 4B. The glass run 4 consists of rubber, synthetic resin or the like, and has a substantially common sectional shape over the respective portions.

Figure 1A:
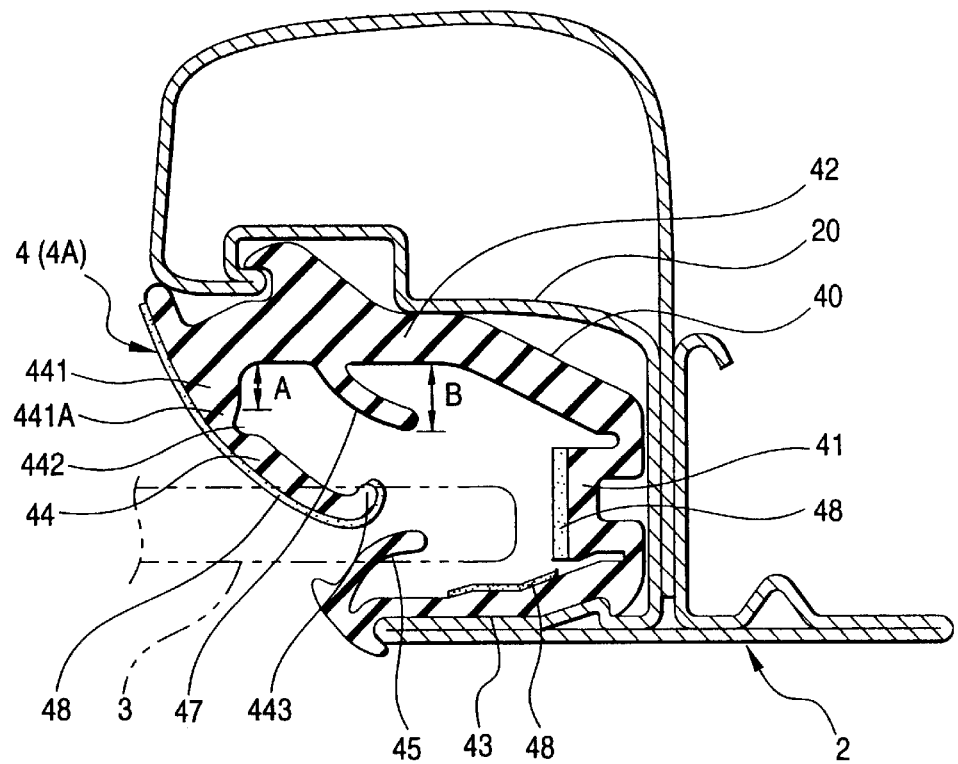
FIG. 1A shows a sectional view of an attachment state of a door glass run according to the present invention, taken along line C—C in FIG. 2.

FIG. 1A shows a section of the vertical portion 4A. The vertical portion 4A has a body portion 40 having a substantially U-shape in section. The body portion 40 is constituted by a bottom wall 41 and interior and exterior side walls 42 and 43 opposite to each other, and first and second seal lips 44 and 45 which are bending gently and extending from the ends of the side walls 42 and 43 toward the deep inside of the body portion respectively so that tip ends of the seal lips 44 and 45 are close and opposite to each other. The interior side wall 42 is formed to be longer than the exterior side wall 43, and the first seal lip 44 is made longer and thicker than the second seal lip 45.

A channel portion 20 having a substantially U-shape in section is formed over the whole length of the inner circumferential side of the door frame 2, and the glass run 4 is attached by fitting the body portion 40 thereof to the channel portion 20. In the front and rear vertical portions 4A of the glass run 4, the door glass 3 moves up and down while the front and rear vertical edges of the door glass 3 are held from both sides by the first and second seal lips 44 and 45, respectively. In the upper side portion 4B, the upper edge of the door glass 3 comes in between the first and second seal lips 44 and 45. In order to improve the sliding property of the door glass 3, a lubricating layer 48 is formed on each of the opposite surfaces of the first and second seal lips 44 and 45, on the bottom surface of the bottom wall 41, and on a part of the inner surface of the exterior side wall 43.

In each of the vertical portions 4A of the glass run 4, a base portion 441 of the first seal lip 44 is made thicker as goes toward the base end, so that rigidity is given thereto. In the portion which shifts from the protrusion end of the base portion 441 to the lip-like tip end side in the first seal lip 44, a notch 442 having a substantially V-shape in section is formed on the inner surface side so as to make the first seal lip 44 thinner therein. Accordingly, the above-mentioned tip end side is easily bent toward the side wall 42.

A sub-lip 47 extending from the inner surface of the interior side wall 42 into the body portion so as to face the first seal lip 44 is formed in the intermediate position of the interior side wall 42. The sub-lip 47 is a little thinner than the general portion of the first seal lip 44. The sub-lip 47 bends gently and extends substantially in parallel with the first seal lip 44. A tip end of the sub-lip 47 is located in a position which is more interior and deeper in the body portion than the tip end of the first seal lip 44.

The end of the first seal lip 44 is bent in an L-shape so as to form a protrusion 443 projecting toward a side surface of the tip end portion of the sub-lip 47. The distance A between the position where the above-mentioned notch 442 of the first seal lip 44 is formed and the inner surface of the interior side wall 42, and the distance B between the tip end of the sub-lip 47 and the inner surface of the interior side wall 42 are made substantially equal to each other, or the position where the above-mentioned notch 442 of the first seal lip 44 is formed is made a little closer to the side wall 42 (A<B). The above-mentioned sub-lip 47, notch 442 and protrusion 443 may be or need not be formed in the above-mentioned upper side portion 4B of the glass run 4.

Figure 1B:
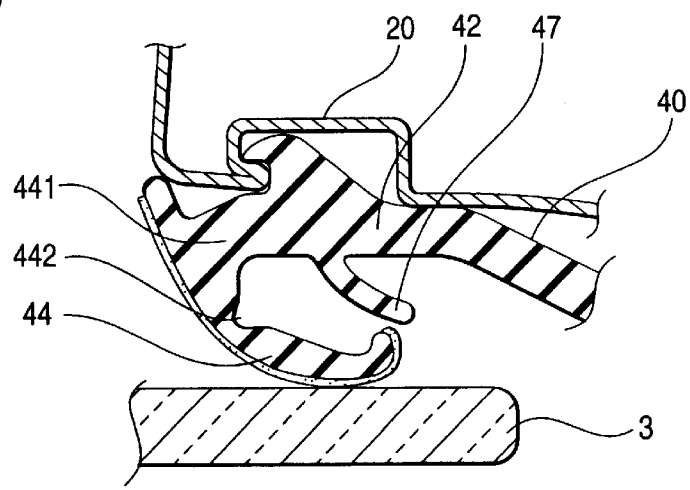
FIG. 1B shows a view showing the positional relationship between seal lips and a sub-lip of the glass run when a door glass is in its regular position.

In the glass run 4 having the above-mentioned structure provided with the sub-lip 47, when the door glass 3 is moved up and down, the first seal lip 44 is pushed by the inner surface of the door glass 3 in the vertical portion 4A of the glass run 4, so that the first seal lip 44 is bent in the portion where the notch 442 is formed, and downed on the interior side, as shown in FIG. 1B. As a result, the protrusion 443 at the tip end of the first seal lip 44 becomes close to the sub-lip 47. When the door glass 3 swings in the width direction of the car at the time of moving the door glass up and down or shutting the door, the protrusion 443 of the first seal lip 44 pushes the sub-lip 47, and both the lips 44 and 47 are bent to the interior side. In such a manner, both the lips 44 and 47 support the door glass 3 in cooperation while the lips 44 and 47 are bent, so that the swing of the door glass 3 is restrained and absorbed. In addition, in this case, both the lips 44 and 47 are bent substantially in the same direction around their base sides, so that the protrusion 443 at the tip end of the first seal lip 44 and the side surface of the tip end portion of the sub-lip 47 which is in contact with the protrusion 443 hardly move relatively to each other. Accordingly, there is no case that frictional resistance or rubbing abrasion is generated between the both.

When the door is shut strongly so that the door glass 3 leans larger to the interior side, the door glass 3 comes in contact with the end portion 441A of the base portion 441 of the first seal lip 44 where the notch 442 is formed, so that the door glass 3 does not make a further lean. In this case, most of the lean force of the door glass 3 is absorbed by the bending of the both lips 44 and 47 before the abutment. Accordingly, a counterforce acting on the door glass 3 at the time of the abutment is so small that the swing of the door glass 3 is attenuated suddenly after the abutment.

Since there is a sufficient distance between the end portion 441A of the base portion 441 where the notch 442 is formed and the inner surface of the door glass 3 located in its regular position, there is no fear that the inner surface of the door glass 3 interferes with the end portion 441A of the base portion 441, even if the door glass 3 leans to the interior side due to the fitting scattering of the door frame 2 or the door glass 3.

Figure 4:
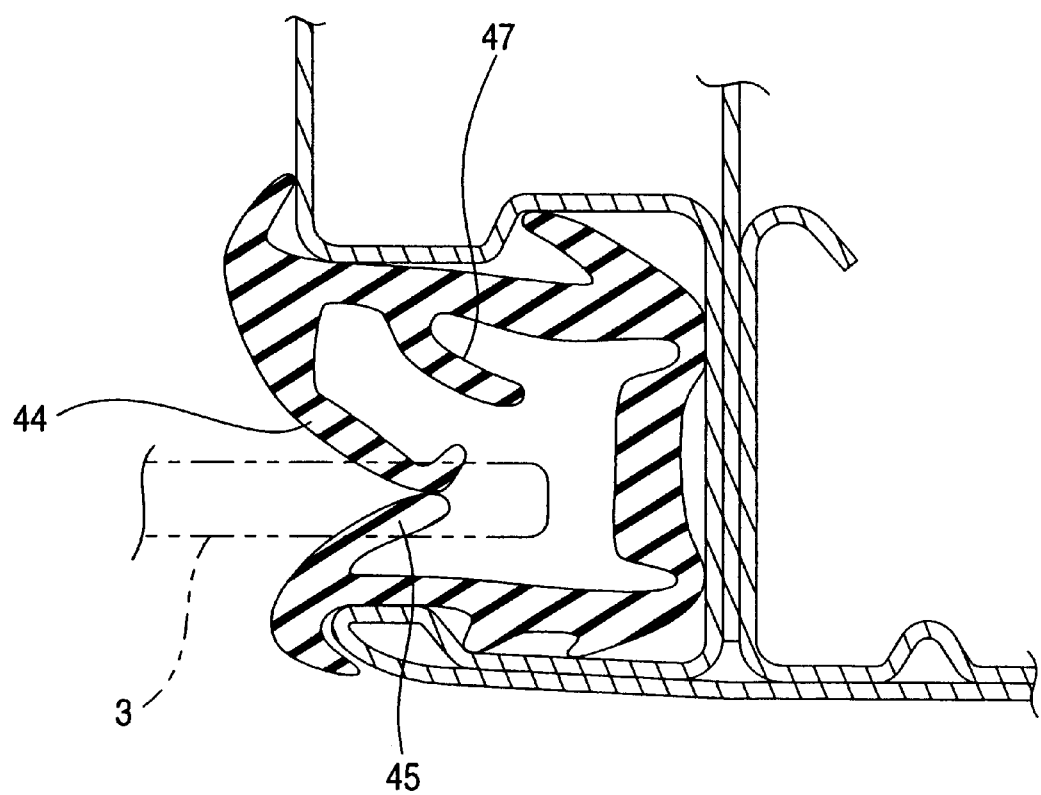
FIG. 4 shows a sectional view of another embodiment of a door glass run according to the present invention

FIG. 4 shows a sectional view of another embodiment of a door glass run according to the present invention. This is an ordinary sash-type glass run. The present invention can be applied to this type glass run.

According to a glass run of the present invention, even if there is a fitting scattering in a door frame or a door glass, the door glass is moved up and down smoothly without any trouble, and the door glass can be prevented from rattling when the door glass is moved up and down and when the door is shut.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A car door glass run being attachable to a car door frame along an inner circumference thereof, said glass run comprising:

a body portion having a substantially U-shape in section, said U-shape being formed by an interior side wall, an exterior side wall and a bottom wall;

first and second seal lips extending from said interior and exterior side walls of said body portion respectively toward said bottom wall so as to approach each other, so that said first and second seal lips hold a circumferential edge portion of a door glass from both sides thereof when the door glass is shut, said first seal lip protruding at an acute angle with respect to said interior side wall; and a sub-lip being formed to extend from an intermediate portion of said interior side wall at an acute angle with respect to said interior side wall, said sub-lip extending substantially in parallel with said first seal lip so as to have an end disposed to be closer to said interior wall and closer to said bottom wall than an end of said first seal lip, wherein said first seal lip has an end, a protrusion formed at an end portion of said end, a base portion extending from the interior side wall, and a notch formed in said first seal lip at a position near said base portion, wherein a thickness of said base portion of said first seal lip tapers between said interior side wall and an end portion of said base portion so that said first seal lip can bend toward said sub-lip with said notch being a fulcrum and said end of said first seal lip being positioned adjacent said end of said sub-lip, wherein a distance between the position where said notch is formed and an inner surface of said interior side wall is smaller than or equal to a distance between the end of said sub-lip and the inner surface of the interior side wall, and wherein said protrusion projects out toward said sub-lip so as to abut against a side surface of a front end of said sub-lip when said first seal lip is substantially bent.

* * * * *